United States Patent
Kim et al.

(10) Patent No.: US 10,740,575 B1
(45) Date of Patent: Aug. 11, 2020

(54) RECEPTION CIRCUIT AND NEAR FIELD COMMUNICATION (NFC) CARD INCLUDING SAME

(71) Applicant: SAMSUNG ELECTRONICS CO., LTD., Suwon-si, Gyeonggi-Do (KR)

(72) Inventors: Kyeong-Do Kim, Seoul (KR); Jun-Ho Kim, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 16/580,105

(22) Filed: Sep. 24, 2019

(30) Foreign Application Priority Data

Feb. 26, 2019 (KR) .................. 10-2019-0022755

(51) Int. Cl.
*H04B 5/00* (2006.01)
*G06K 7/10* (2006.01)
*G06K 19/07* (2006.01)

(52) U.S. Cl.
CPC ..... *G06K 7/10237* (2013.01); *G06K 19/0723* (2013.01)

(58) Field of Classification Search
CPC ............... H04B 5/0025; H04B 5/0056; G06K 7/10237; G06K 19/0723
See application file for complete search history.

(56) References Cited

U.S. PATENT DOCUMENTS

| 6,962,293 | B2 | 11/2005 | Kim |
| 7,971,794 | B2 | 7/2011 | Leutgeb et al. |
| 8,199,043 | B2 | 6/2012 | Van Der Plas et al. |
| 8,203,430 | B2 | 6/2012 | Breitfuss et al. |
| 9,042,816 | B2 | 5/2015 | Frankland |
| 9,608,797 | B2 | 3/2017 | Choke et al. |
| 2008/0223931 | A1* | 9/2008 | Spiess .................. G06K 7/0008 235/439 |
| 2011/0250839 | A1* | 10/2011 | Lee ...................... H04B 5/0037 455/41.1 |

(Continued)

FOREIGN PATENT DOCUMENTS

CN 201110257248 A 3/2013

*Primary Examiner* — Andrew Wendell
(74) *Attorney, Agent, or Firm* — Volentine, Whitt & Francos, PLLC

(57) ABSTRACT

A reception circuit of an NFC card, includes, an input circuit, a reference voltage generator, a comparison circuit and a reference voltage controller. The input circuit receives a wireless signal including pauses and generates an envelope voltage signal. The reference voltage generator generates a detection reference voltage and a selection reference voltage based on the envelope voltage signal and a voltage selection signal. The selection reference voltage varies depending on a minimum voltage level of the pauses. The comparison circuit generates a pause detection signal and a synchronization signal by comparing the envelope voltage signal with the detection reference voltage the selection reference voltage, respectively. The reference voltage controller adjusts a control value of the voltage selection signal based on the pause detection signal and the synchronization signal such that the selection reference voltage is changed depending on the control value of the voltage selection signal.

20 Claims, 18 Drawing Sheets

(56) References Cited

U.S. PATENT DOCUMENTS

| | | | |
|---|---|---|---|
| 2012/0153742 A1* | 6/2012 | Lee | H02J 50/80 307/104 |
| 2013/0089127 A1* | 4/2013 | Kwon | H03D 1/00 375/224 |
| 2015/0236652 A1* | 8/2015 | Yang | H03F 1/0205 330/251 |
| 2016/0173031 A1* | 6/2016 | Langer | H03F 3/19 330/126 |
| 2016/0374021 A1* | 12/2016 | Alpman | H04W 52/0229 |
| 2017/0180919 A1 | 6/2017 | Rittner | |
| 2018/0278213 A1* | 9/2018 | Henzler | H03F 1/0227 |
| 2019/0041434 A1* | 2/2019 | Moreno | G06K 9/0053 |
| 2019/0245385 A1* | 8/2019 | Chandrakasan | H04L 9/0662 |
| 2020/0004990 A1* | 1/2020 | Kurd | H03K 5/24 |

* cited by examiner

| b7 | b6 | b5 | b4 | b3 | b2 | b1 | MEANING |
|----|----|----|----|----|----|----|---------|
| 0  | 1  | 0  | 0  | 1  | 1  | 0  | '26'=REQA |
| 1  | 0  | 1  | 0  | 0  | 1  | 0  | '52'=WUPA |

RECEPTION CIRCUIT AND NEAR FIELD COMMUNICATION (NFC) CARD INCLUDING SAME

CROSS-REFERENCE TO RELATED APPLICATION

This U.S. non-provisional application claims priority under 35 USC § 119 to Korean Patent Application No. 10-2019-0022755 filed on Feb. 26, 2019, the subject matter of which is hereby incorporated by reference.

BACKGROUND

1. Technical Field

Embodiments of the inventive concept relate generally to semiconductor integrated circuits. More particularly, embodiments of the inventive concept relate to reception circuits and near field communication (NFC) cards including the reception circuit.

2. Discussion of the Related Art

Certain communication techniques (or protocols) using contactless NFC cards are described by the International Organization for Standardization and the International Electrotechnical Commission (ISO/IEC) 14443 standards (hereafter, "Standards"). The Standards describe, for example, rise/fall time(s), modulation index(es), etc., associated with transmission signal(s) exchanged between a card reader to an NFC card. The Standards also describe frame time (or frame rates) associated with the reception of signal(s) communicated between the card reader and the NFC card.

However, deviations from the operating characteristics (e.g., signal waveforms) described by the Standards are not uncommon in real world communication environments. And in certain circumstances, such deviations may result in the degradation or interruption of wireless communication between the NFC card and the card reader.

SUMMARY

Some embodiments of the inventive concept provide a reception circuit and an NFC card including the reception circuit capable of enhancing communication efficiency and reliability between a NFC card and a card reader.

According to certain embodiments of the inventive concept, a reception circuit of a near field communication (NFC) card includes; an input circuit, a reference voltage generator, a comparison circuit and a reference voltage controller. The input circuit receives a wireless signal including pauses and generates an envelope voltage signal. The reference voltage generator generates a detection reference voltage and a selection reference voltage based on the envelope voltage signal and a voltage selection signal, such that the selection reference voltage varies depending on a minimum voltage level of the pauses. The comparison circuit generates a pause detection signal activated during the pauses by comparing the envelope voltage signal and the detection reference voltage and generates a synchronization signal indicating a rising start time of the pauses by comparing the envelope voltage signal and the selection reference voltage. The reference voltage controller adjusts a control value of the voltage selection signal based on the pause detection signal and the synchronization signal such that the selection reference voltage is changed depending on the control value of the voltage selection signal.

According to certain embodiments of the inventive concept, a reception circuit of an NFC card includes; an antenna configured to receive a wireless signal including pauses, a rectification circuit configured to rectify an output of the antenna, a first low pass filter configured to filter an output of the rectification circuit to generate an envelope voltage signal, a plurality of division resistors connected in series between a power supply voltage and a ground voltage to provide a plurality of reference voltages, a multiplexer configured to output one of the plurality of reference voltages as a selection reference voltage based on a voltage selection signal, a second low pass filter configured to filter a voltage higher than the plurality of reference voltages to generate a detection reference voltage, a first comparator configured to compare a voltage level of the envelope voltage signal and the detection reference voltage to generate a pause detection signal, a second comparator configured to compare the voltage level of the envelope voltage signal and the selection reference voltage to generate a synchronization signal, and a reference voltage controller configured to adjust a control value of the voltage selection signal based on the pause detection signal and the synchronization signal such that the selection reference voltage is changed depending on the control value of the voltage selection signal.

According to certain embodiments of the inventive concept, an NFC card includes; a resonance unit including an antenna configured to receive and transmit a wireless signal and an NFC card chip. The NFC card chip includes an input circuit configured to receive a wireless signal including pauses and generates an envelope voltage signal, a reference voltage generator configured to generate a detection reference voltage and a selection reference voltage based on the envelope voltage signal and a voltage selection signal, such that the selection reference voltage varies depending on a minimum voltage level of the pauses, a comparison circuit configured to generate a pause detection signal activated during the pauses by comparing the envelope voltage signal and the detection reference voltage and generate a synchronization signal indicating a rising start time of the pauses by comparing the envelope voltage signal and the selection reference voltage, a reference voltage controller configured to adjust a control value of the voltage selection signal based on the pause detection signal and the synchronization signal such that the selection reference voltage is changed depending on the control value of the voltage selection signal, a demodulator configured to generate a demodulation signal corresponding to the pauses of the wireless signal based on the pause detection signal and a modulator configured to modulate output data to generate a modulation signal that is provided to the resonance unit.

Reception circuit(s) and/or NFC card(s) according to embodiments of the inventive concept efficiently perform a demodulation operation by reducing the adverse effects of environmental and operating conditions using a relatively simple configuration.

Reception circuit(s) and/or NFC card(s) according to embodiments of the inventive concept efficiently perform the demodulation operation by adaptively detecting a rising start time of a pause depending on changes of a wireless signal to implement the frame delay time of smaller deviations.

Reception circuit(s) and/or NFC card(s) according to embodiments of the inventive concept reduce power consumption and overall circuit size by detecting the rising start time of the pause without additional clock circuitry.

Reception circuit(s) and/or NFC card(s) according to embodiments of the inventive concept operate as a kind of an analog-to-digital converter (ADC) based on the selection reference voltage, and thus the transmission characteristics may be routinely checked and a signal-to-noise ratio (SNR) improved.

BRIEF DESCRIPTION OF THE DRAWINGS

Embodiments of the inventive concept may be better understood from a consideration of the following detailed description taken in conjunction with the accompanying drawings.

DETAILED DESCRIPTION

Figure 1:
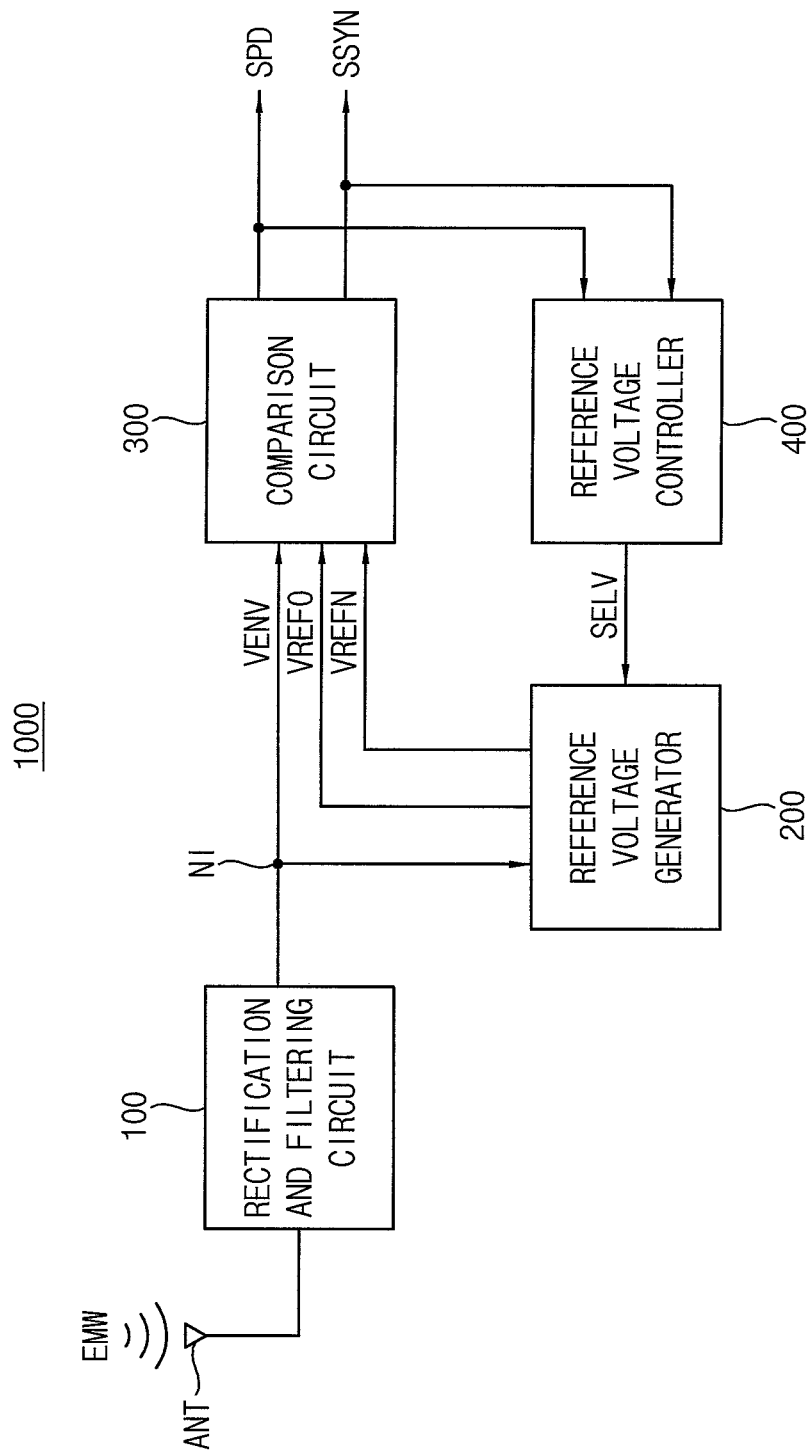
FIG. 1 is a block diagram illustrating a reception circuit of a near field communication (NFC) card according to embodiments of the inventive concept.

Various embodiments of the inventive concept will be described in some additional detail with reference to the accompanying drawings. In the drawings, like reference numbers and labels refer to like or similar elements.

Figure (FIG. 1 is a block diagram illustrating a reception circuit 1000 of a near field communication (NFC) card according to embodiments of the inventive concept.

Referring to FIG. 1, the reception circuit 1000 comprises an input circuit 100 associated with an antenna ANT, a reference voltage generator 200, a comparison circuit 300 and a reference voltage controller 400. In this regard, the term "NFC card" refers to a device capable of wirelessly communicating (i.e., transmitting and/or receiving) information using pauses. In certain embodiments of the inventive concept, an NFC card may be implemented as a smart card, an integrated circuit card, a contactless card, etc.

The input circuit 100 may be used to receive a wireless signal EMW including pauses and generate an envelope voltage signal VENV at a node NI. As shown in the illustrated embodiment of FIG. 1, the input circuit 100 may include a rectification and filtering circuit 100.

The reference voltage generator 200 may be used to generate a detection reference voltage VREF0 and a selection reference voltage VREFN in response to the envelope voltage signal VENV and a voltage selection signal SELV. The selection reference voltage VREFN may vary in accordance with certain minimum voltage level(s) of the pauses.

The comparison circuit 300 may be used to generate a pause detection signal SPD activated during respective pauses and generated by comparing the envelope voltage signal VENV and the detection reference voltage VREF0. The comparison circuit 300 may also be used to generate a synchronization signal SSYN indicating a rising start time for the pauses by comparing the envelope voltage signal VENV and the selection reference voltage VREFN.

The reference voltage controller 400 may be used to define (or adjust) a control value for the voltage selection signal SELV in response to the pause detection signal SPD and the synchronization signal SSYN. That is, the reference voltage controller 400 may be used to perform voltage adjustment operations corresponding to the pauses included in one data frame. The reference voltage controller 400 may adjust the control value of the voltage selection signal SELV such that the selection reference voltage VREFN may be changed depending on the control value of the voltage selection signal SELV.

Figure 14:
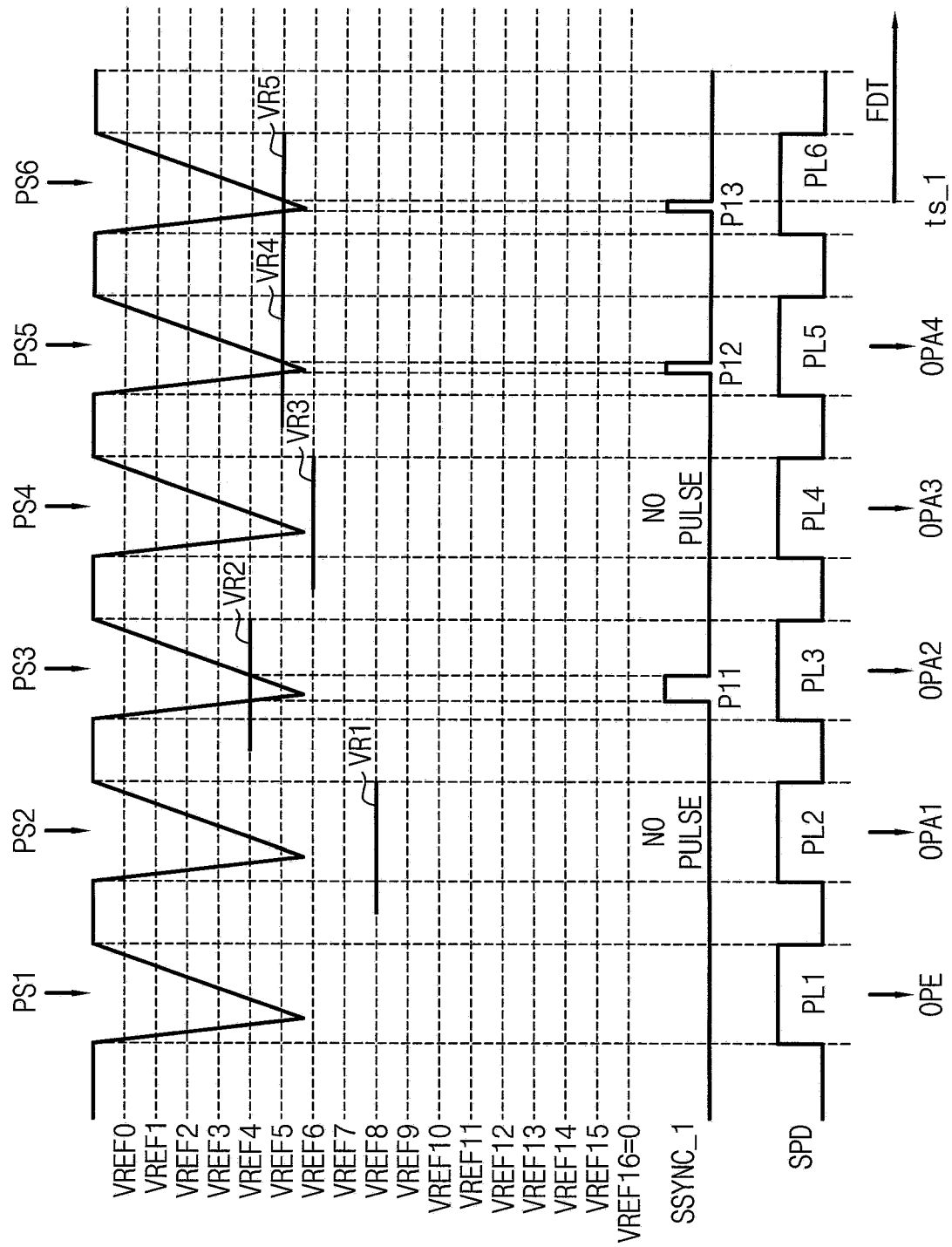
FIGS. 14, 15 and 16 are respective diagrams illustrating other method(s) of searching for a reference voltage according to embodiments of the inventive concept.
Figure 15:
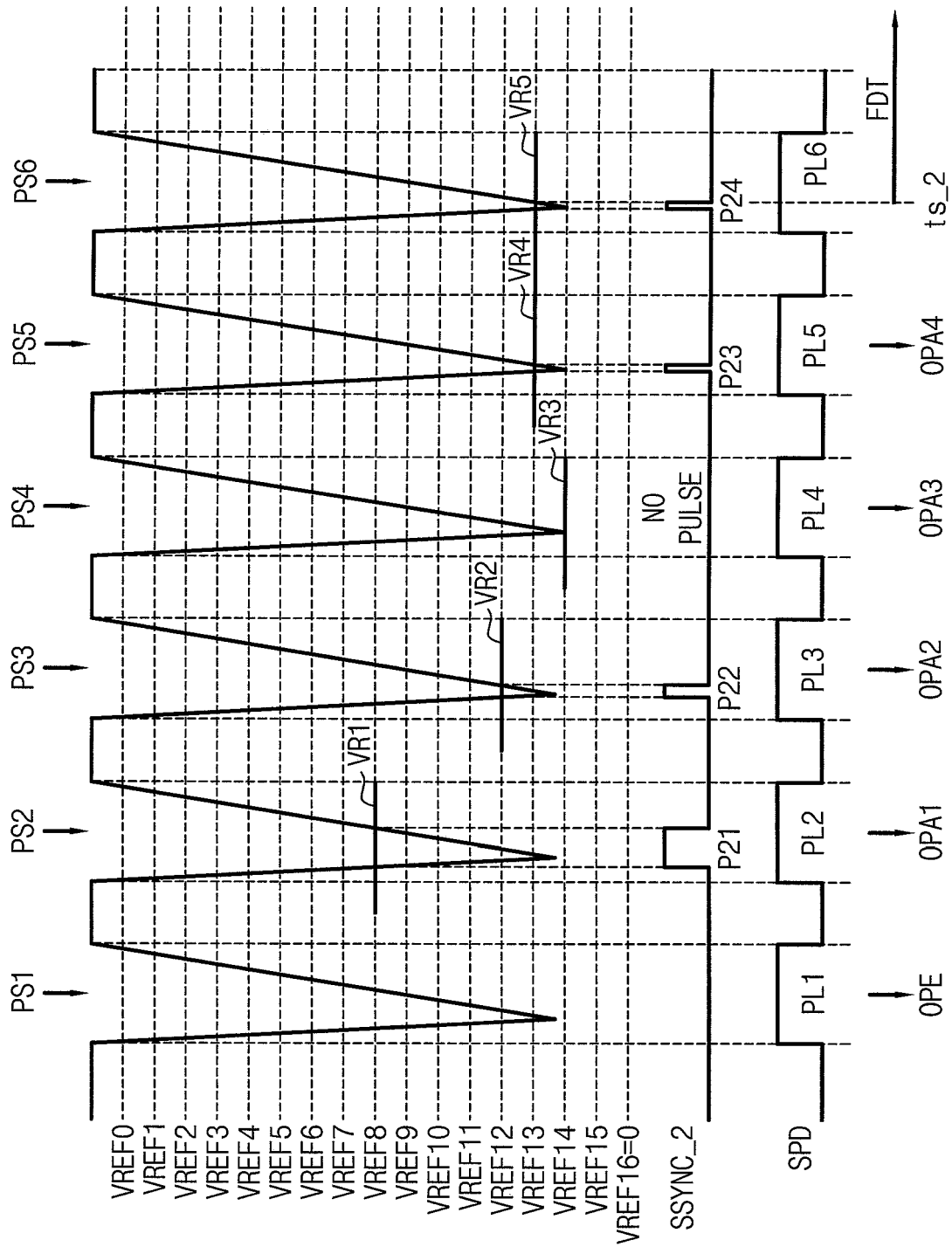
Figure 16:
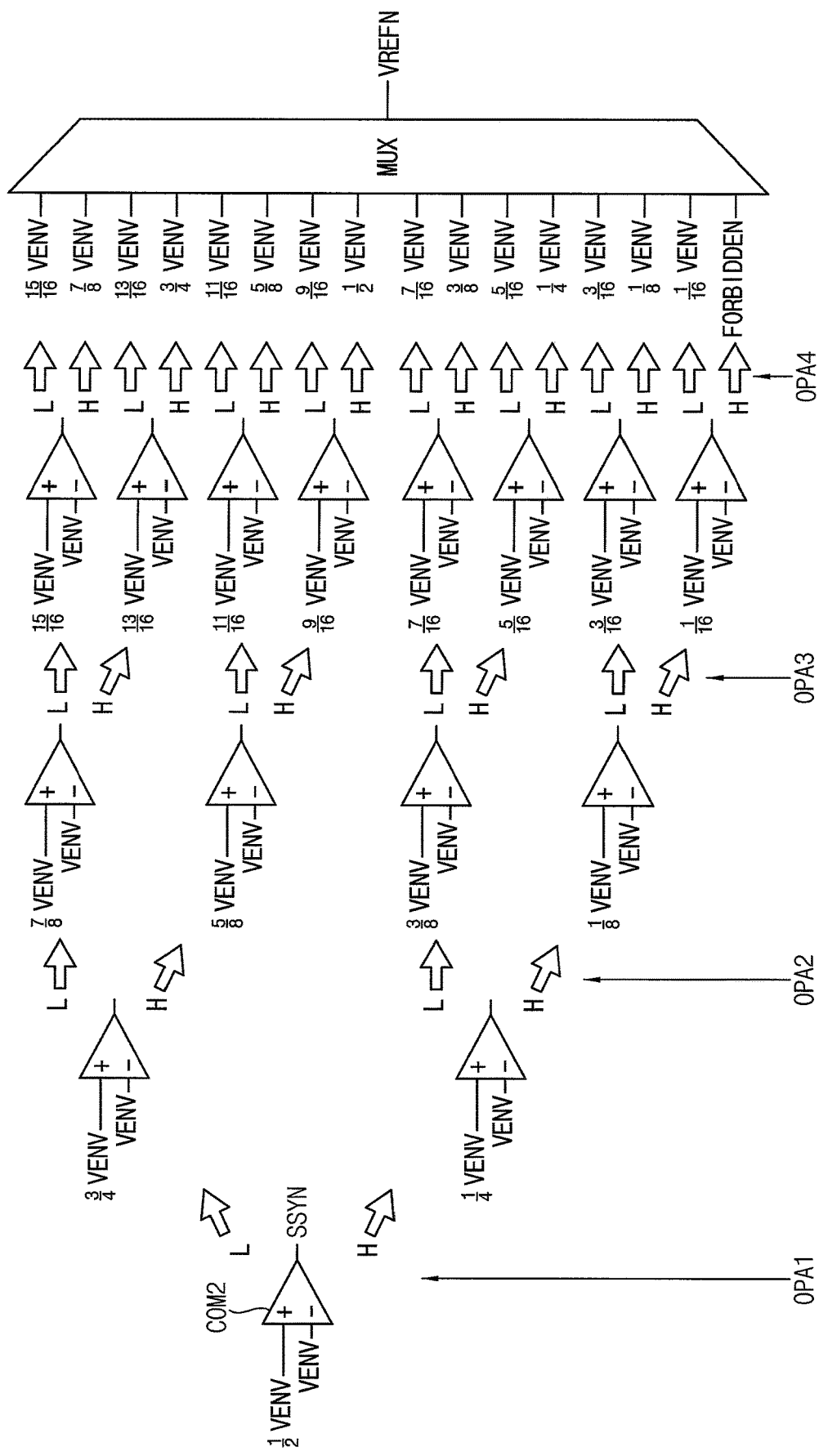

In some embodiments, such as those described hereafter in relation to FIGS. 14, 15 and 16, the reference voltage controller 400 may be used to determine a voltage that most nearly approaches a minimum voltage level for the pauses with reference to the selection reference voltage VREFN using a binary scanning approach.

The magnitude of a reception signal received by the NFC card—which may be indicated by a modulation index (M.I.)—may be obtained by detecting a peak voltage of the reception signal, or by analyzing a wave equation for a complex signal including a phase in addition to the magnitude. However, a modem for processing massive amounts of data is required when an analog-to-digital converter is used to obtain the magnitude of the reception signal. Assuming the use of type A communication, as defined by the ISO/IEC 14443 Standards, low power consumption is required because the contactless NFC card uses an amplitude shift keying (ASK) 100% signal and receives power through a carrier signal. However, certain signal recovery circuits must use an analog comparator having a relatively simple configuration, and thus, deviations may occur in the detected magnitude of the reception signal with respect to one or more aspects of the Standards (e.g., rising time, falling time, modulation index, etc.). Accordingly it is difficult to detect an exact start time for a frame delay time and deviations may occur in the frame delay time.

Reception circuit(s) and/or NFC card(s) according to embodiments of the inventive concept may efficiently perform a demodulation operation by reducing the effects of adverse operating environments using a relatively simple configuration. In addition, reception circuit(s) and NFC card(s) according to embodiments of the inventive concept may efficiently perform a demodulation operation by adaptively detecting a rising start time for a pause depending on changes in a wireless signal in order to develop a frame delay time having relatively smaller (i.e., less frequent and/or less gross in nature) deviations. In addition, reception circuit(s) and NFC card(s) according to embodiments of the inventive concept may reduce power consumption and overall circuit size by detecting the rising start time of the pause without additional clock circuitry. In addition, reception circuit(s) and NFC card(s) according to embodiments of the inventive concept may operate as a kind of an analog-to-digital converter (ADC) based on the selection reference voltage, and thus, the communication characteristics may be routinely checked and signal-to-noise ratio (SNR) may be improved.

Figure 2:
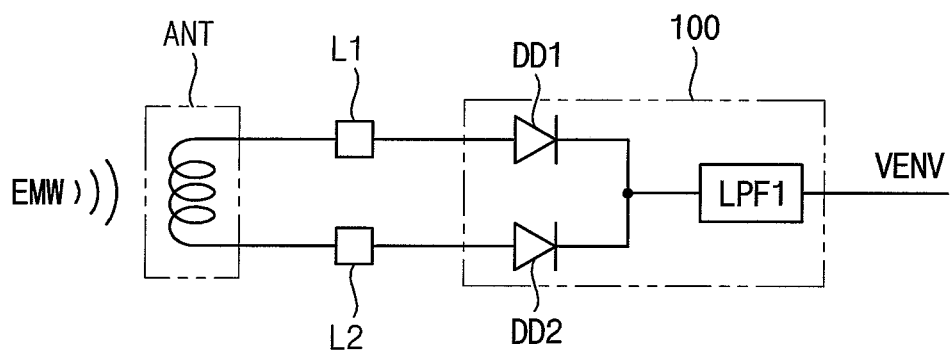
FIG. 2 is a diagram further illustrating in one example the input circuit of the reception circuit of FIG. 1.

FIG. 2 is a diagram further illustrating in one example the input circuit 100 of the reception circuit of FIG. 1.

Referring to FIG. 2, the input circuit 100 operates in conjunction with an antenna ANT and includes a rectification and filtering circuit that includes a rectification circuit (DD1 and DD2) and a low pass filter LPF1.

The antenna ANT may be used to receive the wireless signal EMW from a card reader. The rectification circuit DD1 and DD2 may then be used to rectify an output of the antenna ANT provided via input terminals L1 and L2. The rectification circuit DD1 and DD2 may rectify a current and/or a voltage apparent at the input terminals L1 and L2. The low pass filter LPF1 may then be used to filter an output of the rectification circuit to generate the envelope voltage signal VENV.

A cutoff frequency for the low pass filter LPF1 may be lower than a carrier frequency fc of the wireless signal EMW received via the antenna ANT. Accordingly, the carrier signal of the wireless signal EMW may be efficiently removed by the low pass filter LPF1, and the voltage level of the envelope voltage signal VENV may represent an envelope of the wireless signal EMW. For example, assuming a carrier frequency fc of 13.56 MHz, the cutoff frequency for the low pass filter LPF1 may be set at less than 13.56 MHz to remove the carrier signal from the wireless signal EMW.

Figure 3:
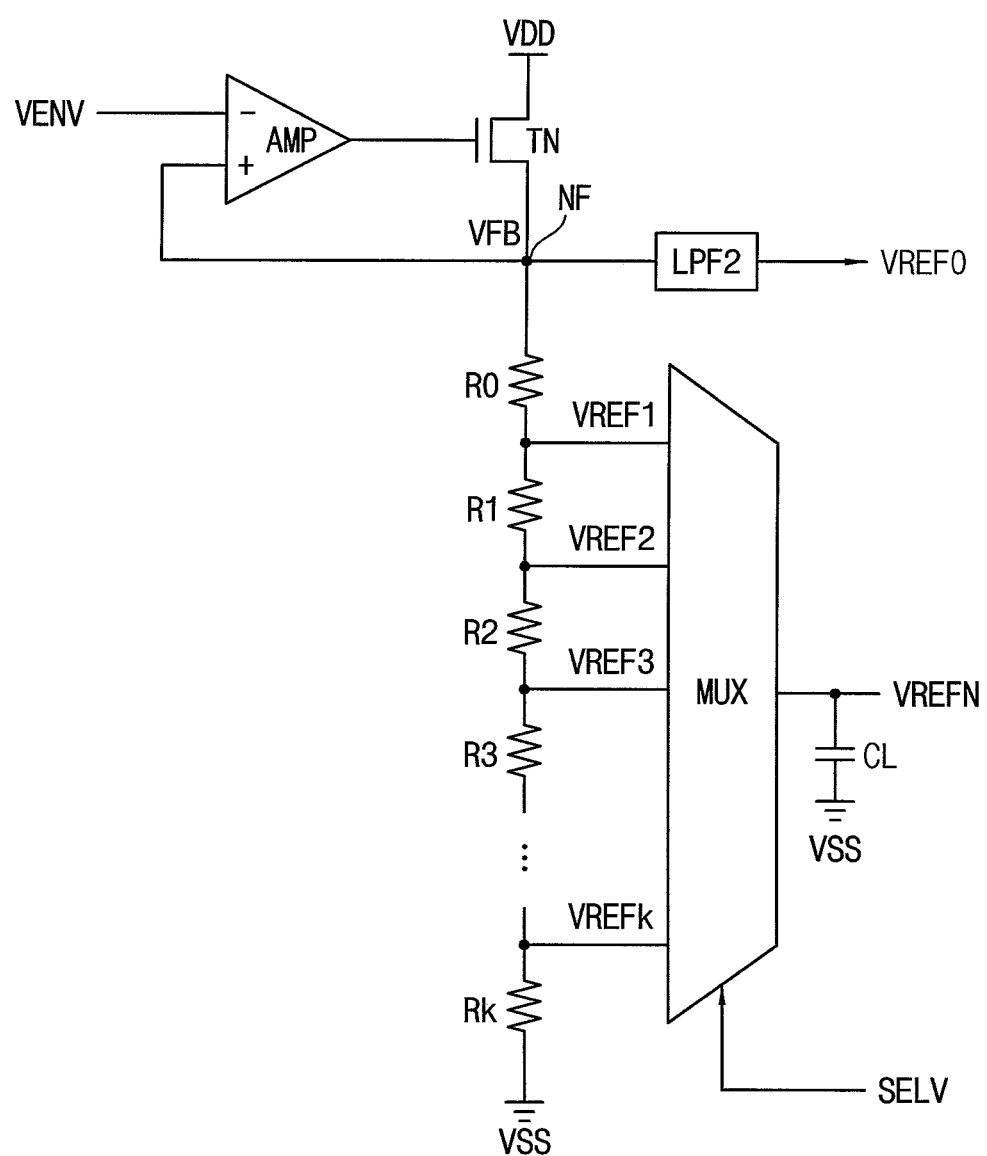
FIG. 3 is a diagram further illustrating in one example the reference voltage generator of the reception circuit of FIG. 1.

FIG. 3 is a diagram further illustrating in one example the reference voltage 200 of the reception circuit of FIG. 1.

Referring to FIG. 3, the reference voltage generator 200 includes a plurality of division resistors R0~Rk and a multiplexer MUX.

The plurality of division resistors R0~Rk may be connected in series between a power supply voltage VDD and a ground voltage VSS to provide a plurality of reference voltages VREF1~VREFk. The multiplexer MUX may output one of the plurality of reference voltages VREF1~VREFk as the selection reference voltage VREFN based on the voltage selection signal SELV.

In certain embodiments, the reference voltage generator 200 may further include a transistor TN, an amplifier AMP and a low pass filter LPF2.

The low pass filter LPF1 may filter voltage(s) higher than the plurality of reference voltages VREF1~VREFk to generate the detection reference voltage VREF0. For example, the low pass filter LPF2 may filter a voltage VFB at a node NF to generate the detection reference voltage VREF0.

A cutoff frequency of the low pass filter LPF2 may be lower than a bit rate of the pauses included in the wireless signal EMW, as communicated by a card reader. Accordingly, the pauses in the envelope voltage signal VENV are attenuated or removed and the detection reference voltage VREF0 may have a direct current (DC) level lower than a DC level of the envelope voltage signal VENV.

For example, a bit rate for the pauses may be about 106 kbit/second (kb/s or kbps), about 212 kb/s, about 424 kb/s, and/or about 848 kb/s according to variously selected operating modes. Assuming the foregoing example, the cutoff frequency for the low pass filter LPF2 may be set to be lower than 106 kHz corresponding to the minimum bit rate of the pauses of the envelope voltage signal VENV.

The transistor TN may be connected between the power supply voltage VDD and the plurality of division resistors R0~Rk. The amplifier AMP may amplify a voltage difference between the voltage VFB higher than the plurality of reference voltages VREF1~VREFk and the envelope voltage signal VENV to provide a gate voltage of the transistor TN.

In some embodiments, the transistor TN and the amplifier AMP may be omitted. In this case, the plurality of division resistors R0~Rk may be connected in series between the node NI of NF of the envelope voltage signal VENV and the low pass filter LPF2 may receive the envelope voltage signal VENV to generate the detection reference voltage VREF0 having a DC voltage level lower than the DC voltage level of the envelope voltage signal VENV.

The reference voltage controller 400 of FIG. 1 may be used to adjust the control value of the voltage selection signal SELV to vary the output of the multiplexer MUX (e.g., the selection reference voltage VREFN).

In some embodiments, the number of the plurality of reference voltages VREF1~VREF16 may be sixteen. In this case, the voltage selection signal SELV may be a multi-bit signal having a 4-bit (binary) control value ranging from 0000 to 1111. The reference voltage controller 400 may be used to determine (or select) one of the possible sixteen (16) values determining (or selecting) the selection reference voltage VREFN from among sixteen reference voltages VREF1~VREF16. However, this embodiment is just one possible implementation approach that may be used.

Figure 4:
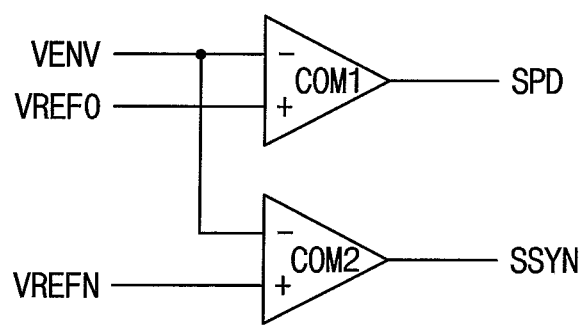
FIG. 4 is a diagram further illustrating in one example the comparison circuit of the reception circuit of FIG. 1.

FIG. 4 is a diagram further illustrating in one example the comparison circuit 300 of the reception circuit of FIG. 1.

Referring to FIG. 4, the comparison circuit 300 comprises a first comparator COM1 and a second comparator COM2.

The first comparator COM1 may be used to compare a voltage level of the envelope voltage signal VENV and the detection reference voltage VREF0 to generate the pause detection signal SPD. The second comparator COM2 may compare the voltage level of the envelope voltage signal VENV and the selection reference voltage VREFN to generate the synchronization signal SSYN.

The reference voltage controller 400 may adjust the control value of the voltage selection signal SELV based on whether the synchronization signal SSYN is activated during activation periods of the pause detection signal SPD.

In some embodiments, like the ones described hereafter in relation to FIGS. 14 and 15, the pause detection signal SPD may be activated in a pulse form when the voltage level of the envelope voltage signal VENV is lower than the detection reference voltage VREF0, and the synchronization signal SSYN may be activated in a pulse form when the voltage level of the envelope voltage signal VENV is lower than the selection reference voltage VREFN. In such a case, the reference voltage controller 400 may adjust the control value of the voltage selection signal SELV based on whether the synchronization signal SSYN includes a pulse during each activation period of the pause detection signal SPD.

The reference voltage controller may adjust the control value of the voltage selection signal SELV to decrease the selection reference voltage VREFN when the synchronization signal SSYN includes a pulse during each activation period of the pause detection signal SPD. In addition, the reference voltage controller 400 may adjust the control value of the voltage selection signal SELV to increase the selection reference voltage VREFN when the synchronization signal SSYN does not include a pulse during each activation period of the pause detection signal SPD.

It should be noted at this point in the detailed description that since the advent of credit cards in the 1920's, the number and type of electronic information cards have evolved, including as examples; debit (or cash) cards, credit cards, identification cards, department store cards, etc. Recently however, NFC cards (and integrated circuit (IC) cards in general), have become more popular as they offer greater flexibility and convenience in use, as well as improved security and stability. They also provide a platform for numerous applications.

In general, NFC cards (and IC cards in general) have a physical a shape such that a thin semiconductor device is embedded or attached to a plastic card about the same size as a credit card. Compared with conventional credit cards including a magnetic media strip, the NFC cards enjoy various benefits including high stability, write-protected data, and high security. For this reason, NFC cards have become widely accepted as a multimedia information media.

NFC cards may be roughly classified as a contact IC card, a Contactless IC Card (CICC), and a Remote Coupling Communication Card (RCCC). In connection with the CICC, ISO/IEC have described a specialized system for worldwide standardization. Particularly, the ISO/IEC 14443 Standards noted above, describe certain physical characteristic(s), radio frequency ranges, signal interface(s), initialization and anti-collision approach(es), and transmission protocol(s) for NFC and related card readers. Under ISO/IEC 14443 Standards, the contactless IC cards incorporate an integrated circuit (IC) that performs data processing and/or memory functionality. The possibility of contactless card technology is a result of the achievement of signal exchange via inductive coupling with a proximity coupling device (that is, a card reader) and to ability to supply power to the card without the use of galvanic elements (i.e., the absence of an ohmic path from the external interfacing equipment to the integrated circuit(s) contained within the card). A card reader produces an energizing radio frequency (RF) field which is coupled to the card in order to transfer power and which is modulated for communication. The carrier frequency fc of the RF operating field is 13.56 MHz+7 kHZ.

Figure 5:
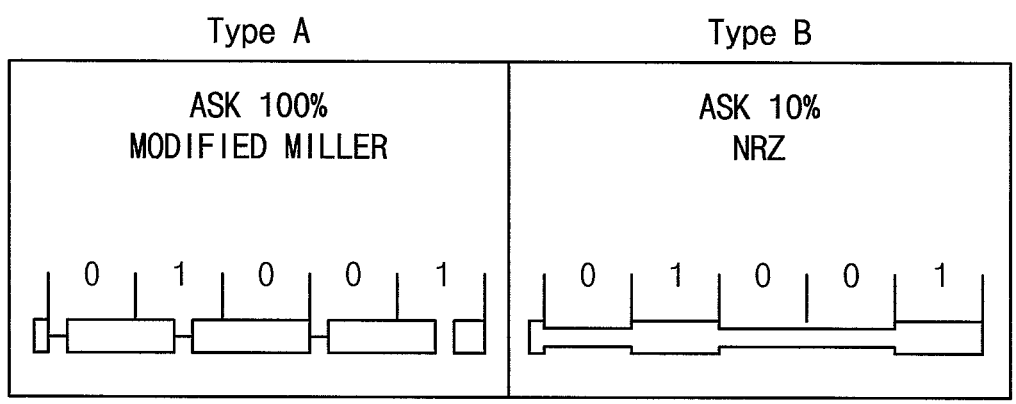
FIGS. 5 and 6 are respective diagrams illustrating examples of communication signals for a type A interface described in the ISO/IEC 14442 Standards.
Figures 6, 7:
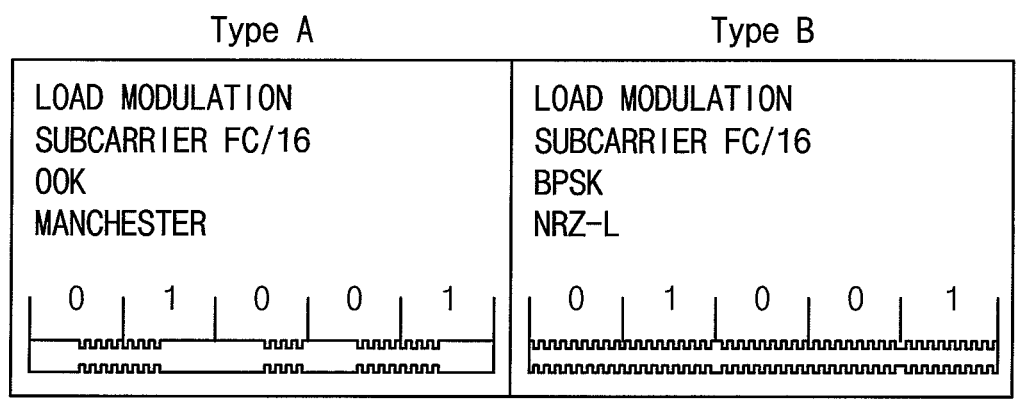
FIGS. 7, 8, 9, and 10 are respective diagrams illustrating examples of frames and pauses for the type A interface described in the ISO/IEC 14442 Standards.

FIGS. 5 and 6 are respective diagrams illustrating examples of communication signals for a type A interface as described by the ISO/IEC 14442 Standards. FIGS. 7, 8, 9, and 10 are respective diagrams illustrating examples of frames and pauses associated with the type A interface.

FIG. 5 illustrates a signal communicated (e.g., transferred) from a card reader to a contactless IC card, while FIG. 6 illustrates a signal communicated from the contactless IC card to the card reader.

The ISO/IEC 14443 Standards describe two (2) communication signal interfaces, Type A and Type B. Under the communication signal interface Type A, communication from a card reader to a contactless IC card utilizes a modulation principle of ASK 100% of the RF operating field and a Modified Miller code principle. The bit rate for the transmission from the card reader to the contactless IC card is fc/128, that is, 106 kbps (kb/s). Transmission from the contactless IC card to the card reader is coded by the Manchester code principle and then modulated by the On-Off Key (OOK) principle. Presently, contactless IC cards that are managed by the communication signal interface of Type A in subways and buses, generate timing of a constant interval of time using an ASK-modulated signal received from a card reader, and receive and transmit data one bit at a time.

Figure 8:
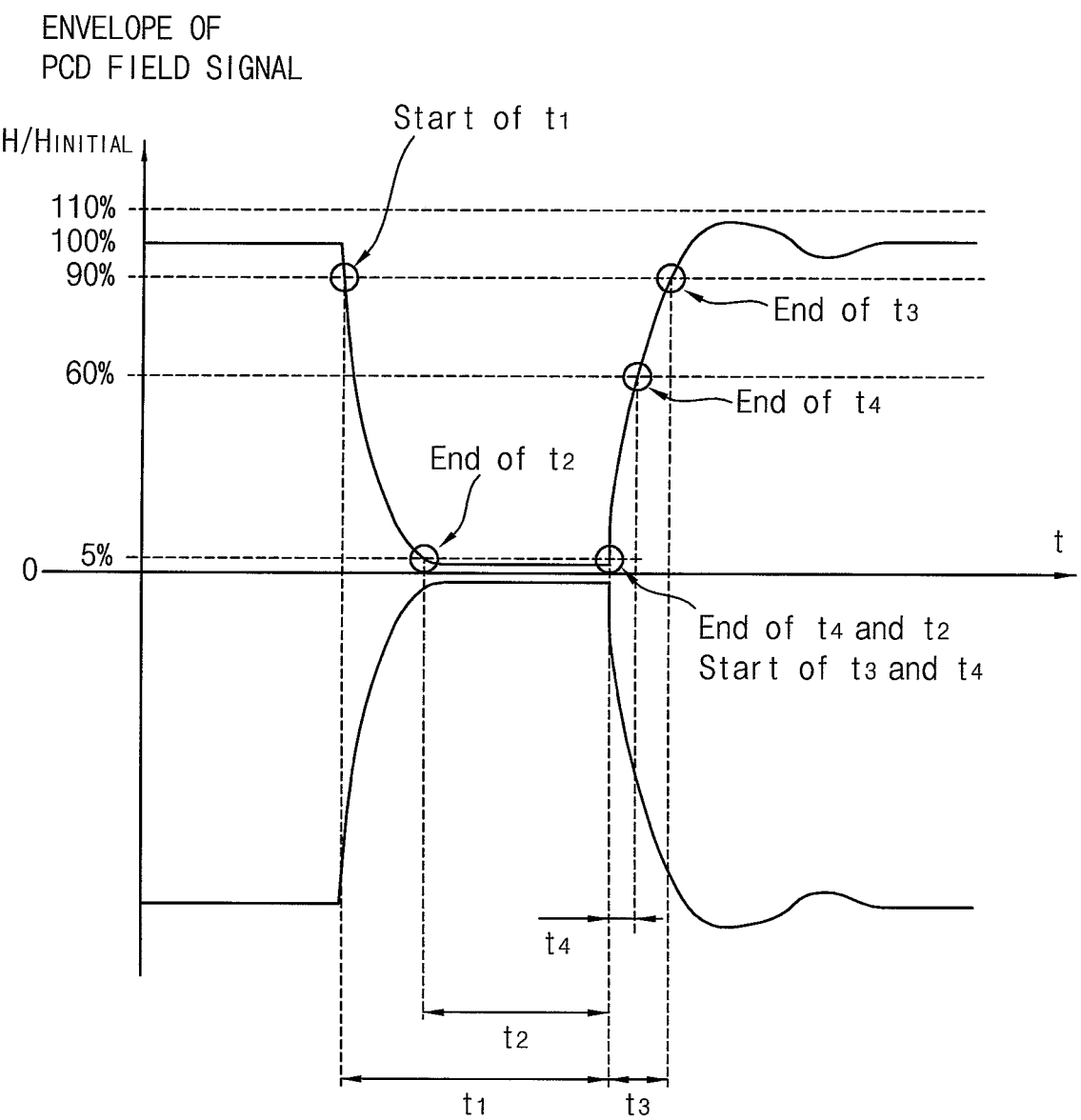
Figure 9:
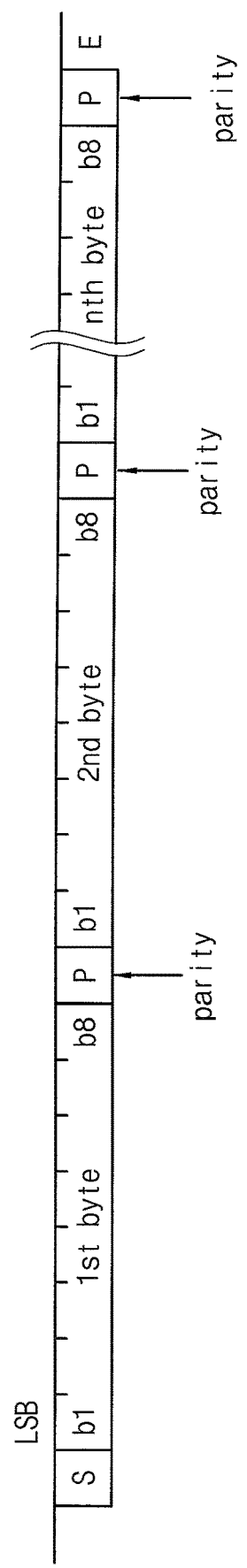
Figure 10:
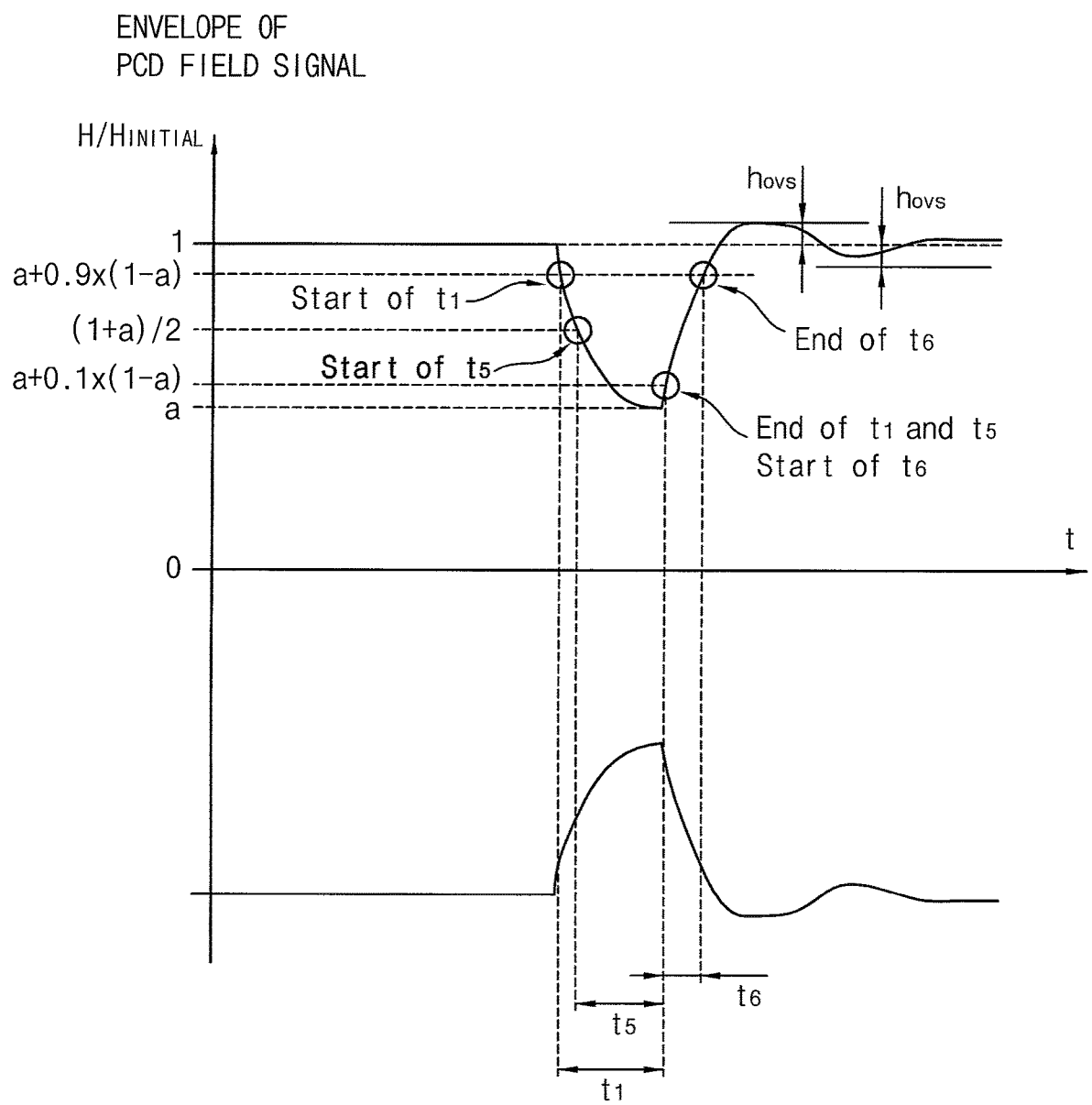

When data is transferred from a contactless IC card to a card reader, power is stably provided to the contactless IC card from the card reader. However, when data is transferred to the contactless IC card from the card reader, a pause period t2 as shown, for example, in FIGS. 8, 9 and 10 is created. That is, power to the card reader from the IC card is interrupted during the pause period t2. At that time, a clock signal generated in an RF receiver has a discontinuous waveform. Under these conditions, it is difficult to maintain the bit rate of 106 kbps specified by the ISO/IEC 14443 Type A Standards, because a synchronous clock signal for transmission and receipt is generated by dividing such a clock signal having a discontinuous period.

FIGS. 7, 8 and 9 respectively, further illustrate Type A data frames associated with the ISO/IEC 14443 Standards, where FIG. 7 shows a short frame including a start bit S, data bits b1~B7 and an end bit E, and FIG. 9 shows a standard frame including a combination of a start bit S, data bits b1~b8, a parity bit P and an end bit E. FIG. 8 shows a pause waveform corresponding to the short frame, and FIG. 10 shows a pause waveform corresponding to the standard frame.

In each of FIGS. 8 and 10, the horizontal axis indicates time, and the vertical axis indicates a field signal from a card reader PCD, where "a" in FIG. 10 indicates a pulse shape factor for the Type A communication, "H" indicates an equivalent homogenous magnetic field strength, "Hinitial" indicates a strength of an unmodulated RF field, and "hovs" indicates an envelope overshoot. Further, "t1" indicates a length of the pause, "t2" and "t5" indicate a low time of the pause, "t3" and "t5" indicate a rising time of the pause, and "t4" indicates a section of the rising time.

In general, a decoding circuit included in a contactless IC card may extract bits from a received wireless signal, divide the extracted bits into the start bit, the data bits and the end bit, and determine the received data from the divided bits.

The transmission from the IC card to the card reader must be performed after the frame delay time FDT, which is specified by the standards, from the rising start time of a last pause among the pauses of one data frame. However, it is difficult to generate a clock synchronization signal from the wireless signal including the discontinuous intervals, that is, the pauses, and implement the exact frame delay time FDT using the clock synchronization signal.

Figure 11:
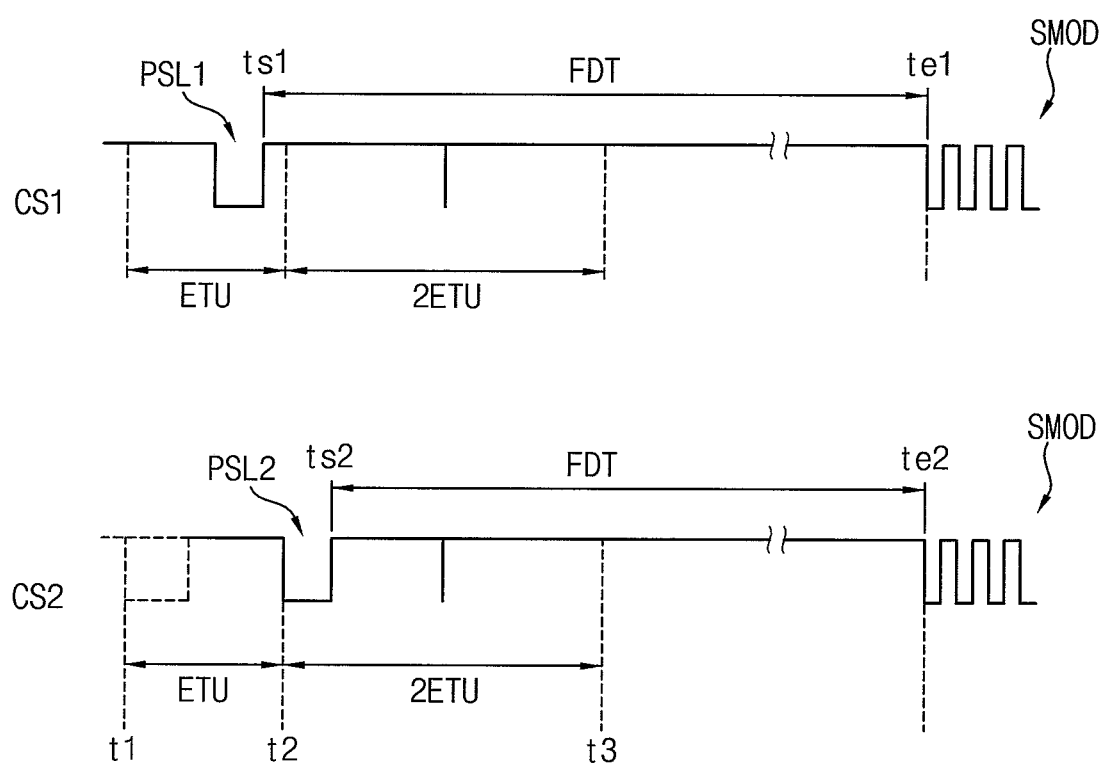
FIGS. 11 and 12 are respective diagrams further describing certain deviations in a frame delay time.
Figure 12:
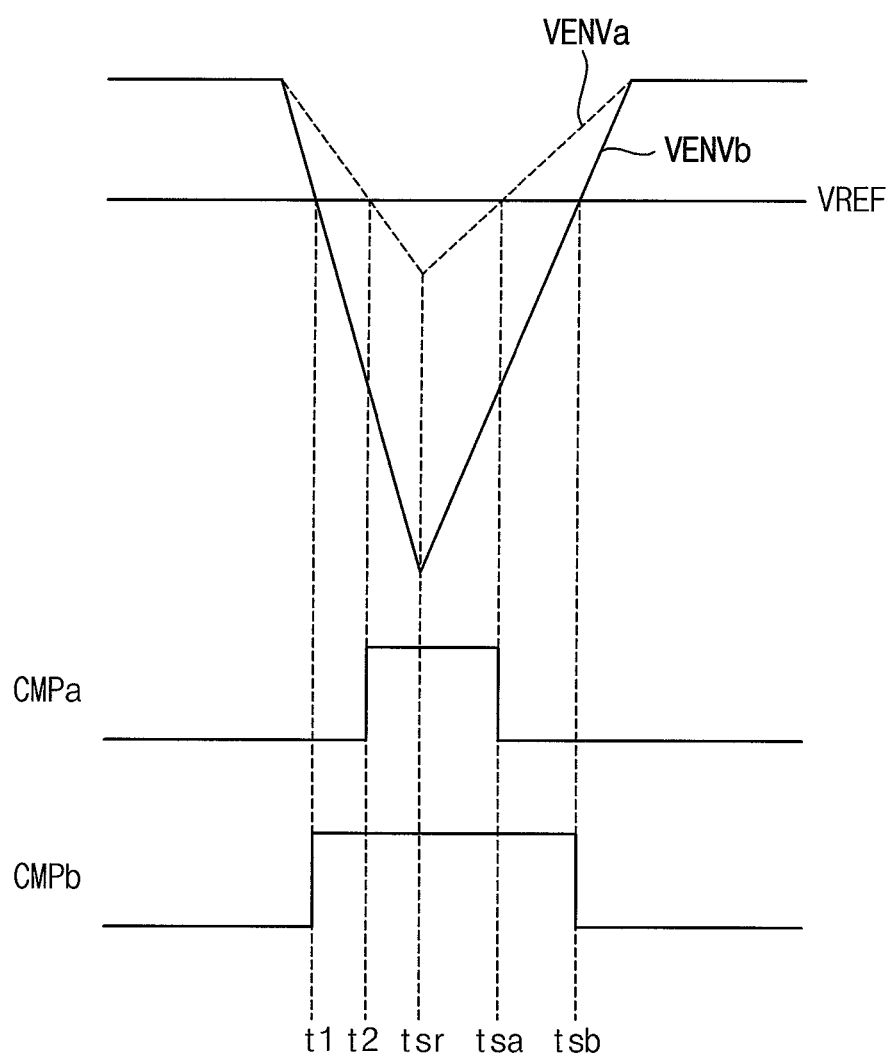

FIGS. 11 and 12 are respective diagrams further describing deviations in a frame delay time.

Referring to FIG. 11, a frame delay time FDT corresponds to a time interval between an end point of the last pause PLS1 or PLS2, that is a rising start time ts1 or ts2 of the frame transmitted by a card reader and a first modulation edge of a start bit transmitted by an NFC card (i.e., a start time te1 or te2 of a modulation signal SMOD). The ISO/IEC 14442 Standards specify that the frame delay time 1-DT according to a command type and a logic state of a last data bit of the frame transferred from the card reader. In FIG. 11, "ETU" indicates an elementary time unit corresponding to one data bit.

A first case CS1 is a case that the last bit transferred by the card reader is "1", and the communication end is identified when two elementary time units 2ETU following the value of "1" corresponds to the sequence Y. A second case CS2 is a case that the last bit transferred by the card reader is "0", and the communication end is identified when two elementary time units 2ETU following the value of "1" corresponds to the sequence Z or the sequence Y.

As illustrated in FIG. 12, the waveform of the pause of the wireless signal may be changed according to the communication environment and/or the operational conditions of the card reader and/or the NFC card. In case of a first envelope voltage signal VENVa, the comparison signal CMPa of the reference voltage VREF and the first envelope voltage signal VENVa is activated during the time interval t2~tsa. In case of a second envelope voltage signal VENVb, the comparison signal CMPb of the reference voltage VREF and the second envelope voltage signal VENVb is activated during the time interval t1~tsb.

When the communication environments and/or operational conditions are not considered and the reference voltage VREF is fixed, the rising start time is detected as tsa in case of the first envelope voltage signal VENVa and the rising start time is detected as tsb in case of the second envelope voltage signal VENVb, even though the real rising start time is the same as tsr.

As such, because the proper reference voltage VREF is not known, the deviation occurs in the rising start time of the pause and thus deviation occurs in the frame delay time FDT. The communication between the card reader and the NFC card may be impossible or the communication efficiency may be degraded due to such deviation in the frame delay time FDT.

Certain reception circuit(s) and/or NFC card(s) according to embodiments of the inventive concept may efficiently perform a demodulation operation by adaptively detecting a rising start time of a pause depending on changes of a wireless signal to implement a frame delay time having smaller deviations. In addition, reception circuit(s) and/or NFC card(s) according to embodiments of the inventive concept may reduce power consumption and overall circuit size by detecting the rising start time of the pause without additional clock circuitry. Reception circuit(s) and/or NFC card(s) according to embodiments of the inventive concept may demodulate the reception signal by generating a proper offset using hardware without options of additional firmware and software. In other words, reception circuit(s) and/or NFC card(s) may efficiently perform a demodulation operation by reducing the adverse effects of the environment and/or operational conditions with a relatively simple configuration.

Figure 13:
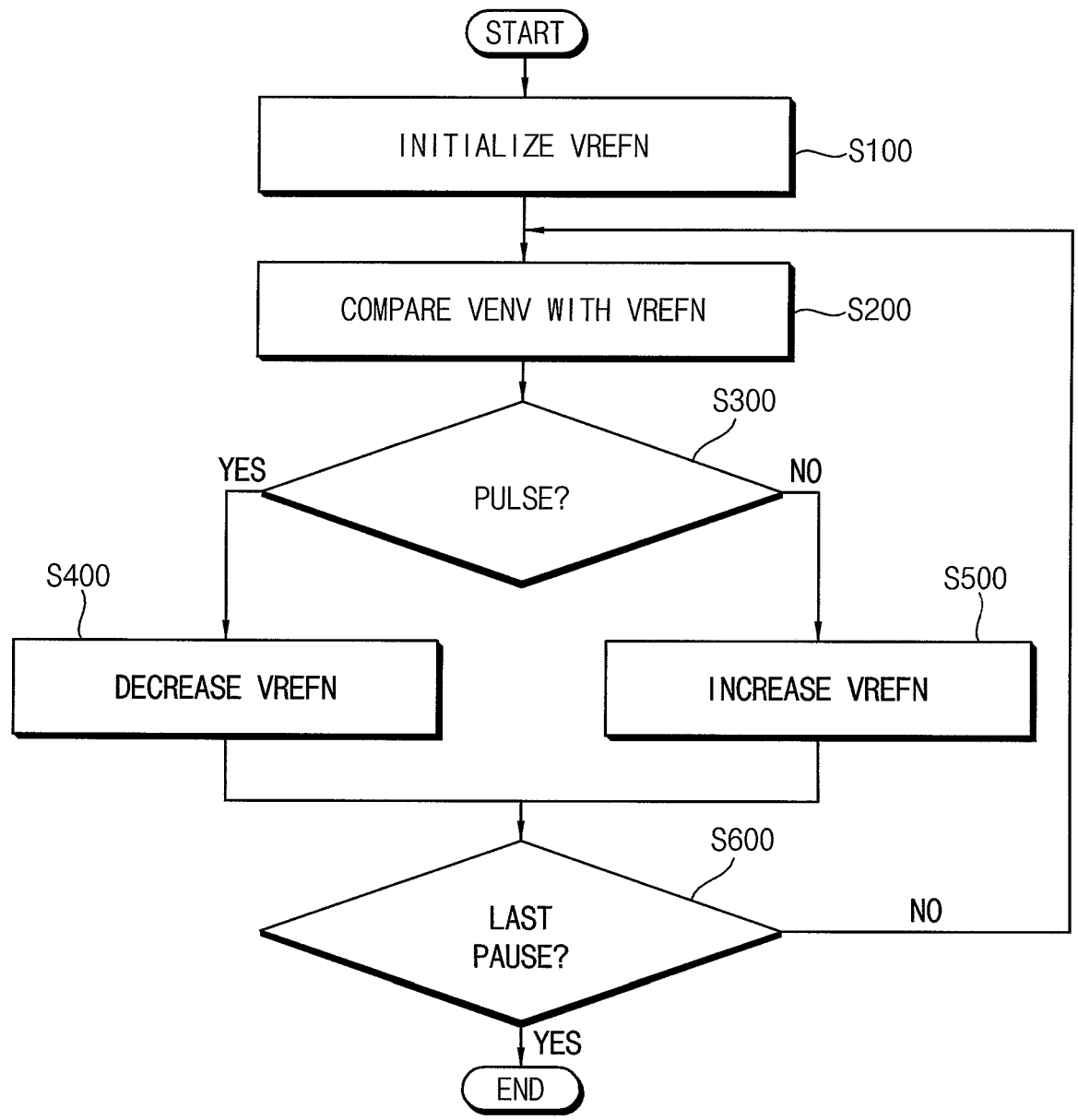
FIG. 13 is a flow chart summarizing one method of searching for a reference voltage in a reception circuit according to embodiments of the inventive concept.

FIG. 13 is a flow chart summarizing in one example a method of searching for a reference voltage in a reception circuit according to embodiments of the inventive concept.

Referring to FIGS. 1, 2, 3, 4 and 13, the reference voltage controller 400 may be used to initialize the selection reference voltage VREFN (S100). The comparison circuit 300 may be used to generate the synchronization signal SSYN by comparing the envelope voltage signal VENV and the selection reference voltage VREFN.

As will be described hereafter in relation to the embodiments illustrated in FIGS. 14 and 15, the synchronization signal SSYN may include pulses that are activated during the time intervals when the voltage level of the envelope voltage signal VENV is lower than the selection reference voltage VREFN.

When the synchronization signal SSYN includes a pulse (S300=YES), the reference voltage controller 400 may adjust the control value of the voltage selection signal SELV to decrease the selection reference voltage VREFN (S400).

In contrast, when the synchronization signal SSYN does not include a pulse (S300=NO), the reference voltage controller 400 may adjust the control value of the voltage selection signal SELV to increase the selection reference voltage VREFN (S500).

With the foregoing method embodiment in mind, the sequence of operations S200, S300, S400 and S500 may be referred to as a "voltage adjustment operation", while operation S100 may be referred to as an "initialization operation", where the initialization operation may be performed during a first pause of one data frame, and the voltage adjustment operation may be repeatedly performed during a second pause of the one data frame.

FIGS. 14, 15 and 16 are respective diagrams further illustrating certain method(s) of searching for a reference voltage according to embodiments of the inventive concept.

FIGS. 14 and 15 illustrate an example assuming the use of sixteen (16) reference voltages VREF1~VREF16, and including first through sixth pauses PS1~PS6 of equal time interval included in one data frame for convenience of illustration and description. However, the intervals between the pauses may be variously determined according to the transferred command or data in other embodiments of the inventive concept.

Referring to FIGS. 14 and 15, an initialization operation OPE may be performed during the first pause PS1, and first through fourth voltage adjustment operations OPA1~OPA4 may be performed sequentially during the second through fifth pauses PS2~PS5. After the sixth pause PS6, the result of the fourth voltage adjustment operation OPA4 corresponding to the fifth pause PS5 may be maintained.

As the result of a comparison operation performed by the first comparator COM1, the pause detection signal SPD may be activated in a pulse form when the voltage level of the envelope voltage signal VENV is lower that the detection reference voltage VREF0.

As illustrated in FIGS. 14 and 15, the pause detection signal SPD may include first through sixth detection pulses PL1~PL6 corresponding to the first through sixth pauses PS1-PS6.

The reference voltage controller 400 may initialize the control value of the voltage selection signal SELV during the first pause PS1 of the pauses PS1-PS6 included in the one data frame such that the selection reference voltage VREFN is a half of the detection reference voltage VREF0. In other words, the reference voltage controller 400 may be initialized in response to the first detection pulse PL1 and the control value of the voltage selection signal SELV may be initialized.

The synchronization signal SSYN may be activated in a pulse form when the voltage level of the envelope voltage signal VENV is lower than the selection reference voltage VREFN. In this case, the reference voltage controller 400 may adjust the control value of the voltage selection signal SELV based on whether the synchronization signal SSYN includes a pulse during activation periods of the pause detection signal SPD.

The reference voltage controller 400 may be used to adjust the control value of the voltage selection signal SELV to decrease the selection reference voltage VREFN when the synchronization signal SSYN includes a pulse during each activation period of the pause detection signal SPD. In contrast, the reference voltage controller 400 may be used to adjust the control value of the voltage selection signal SELV to increase the selection reference voltage VREFN when the synchronization signal SSYN does not include a pulse during each activation period of the pause detection signal SPD.

Referring to FIG. 14, the synchronization signal SSYNC_1 does not include a pulse during the activation period of the second detection pulse PL2 of the pause detection signal SPD and the selection reference voltage VREFN is increased from VR1 to VR2 by the first voltage adjustment operation OPAL The synchronization signal SSYNC_1 includes a pulse P11 during the activation period of the third detection pulse PL3 of the pause detection signal SPD and the selection reference voltage VREFN is decreased from VR2 to VR3 by the second voltage adjustment operation OPA2. The synchronization signal SSYNC_1 does not include a pulse during the activation period of the fourth detection pulse PL4 of the pause detection signal SPD and the selection reference voltage VREFN is increased from VR3 to VR4 by the third voltage adjustment operation OPA3. Even though the synchronization signal SSYNC_1 includes a pulse P12 during the activation period of the fifth detection pulse PL5 of the pause detection signal SPD, the result of the third voltage adjustment operation OPA3 may be maintained by the fourth voltage adjustment operations OPA4. In other words, the VR4 of the fifth pause PS5 may be maintained to be equal to the VR5 of the sixth pause PS6.

Referring to FIG. 15, the synchronization signal SSYNC_2 includes a pulse P21 during the activation period of the second detection pulse PL2 of the pause detection signal SPD and the selection reference voltage VREFN is decreased from VR1 to VR2 by the first voltage adjustment operation OPAL The synchronization signal SSYNC_2 includes a pulse P22 during the activation period of the third detection pulse PL3 of the pause detection signal SPD and the selection reference voltage VREFN is decreased from VR2 to VR3 by the second voltage adjustment operation OPA2. The synchronization signal SSYNC_2 does not include a pulse during the activation period of the fourth detection pulse PL4 of the pause detection signal SPD and the selection reference voltage VREFN is increased from VR3 to VR4 by the third voltage adjustment operation OPA3. Even though the synchronization signal SSYNC_2 includes a pulse P23 during the activation period of the fifth detection pulse PL5 of the pause detection signal SPD, the result of the third voltage adjustment operation OPA3 may be maintained by the fourth voltage adjustment operations OPA4. In other words, the VR4 of the fifth pause PS5 may be maintained to be equal to the VR5 of the sixth pause PS6.

FIG. 16 illustrates a binary scanning approach, again assuming for the sake of convenience sixteen (16) reference voltages of equal voltage interval.

The comparator shown in FIG. 16 may correspond to the above-described second comparator COM2 that generates the synchronization signal SSYN by comparing the voltage level of the envelope voltage signal VENV and the selection reference voltage VREFN.

The selection reference voltage VREFN may be varied sequentially based on the comparison result of the second comparator through first through fourth voltage adjustment operations OPA1~OPA4.

For example, the selection reference voltage VREFN may be increased when the output of the second comparator COM2, that is, the synchronization signal SSYN has a logic low level L and the selection reference voltage VREFN may be decreased when the synchronization signal SSYN has a logic high level H.

While the first through fourth voltage adjustment operations OPA1~OPA4 are performed sequentially, the amount of the change of the selection reference voltage may be decreased by a half, which may be referred to as the binary scanning scheme.

Figures 17, 18:
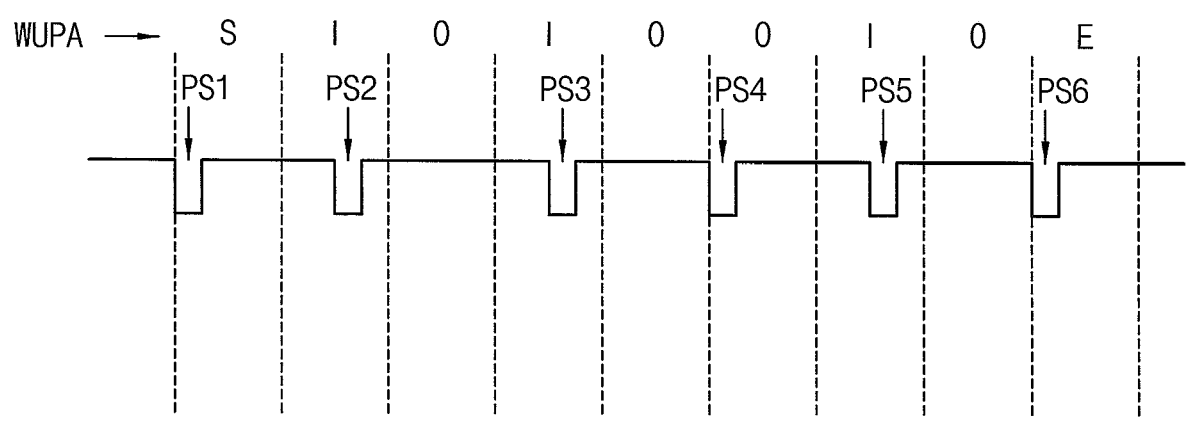
FIGS. 17 and 18 are respective diagrams illustrating in one example a wakeup command and a wireless signal corresponding to the wakeup command for the type A interface described in the ISO/IEC 14442 Standards.

FIGS. 17 and 18 are respective diagrams illustrating a wakeup command and a wireless signal corresponding to the wakeup command for a type A interface of ISO/IEC 14442 Standards.

FIG. 17 illustrates a request command REQA and a wakeup command WUPA having a short frame format, and FIG. 18 illustrates a waveform corresponding to the wakeup command. In FIGS. 17 and 18, b1~b7 indicate binary bits of the commands, and '26' and '52' indicate hexadecimal values of the commands.

Among the commands of ISO/IEC 14443 Type A interface, the wakeup command WUPA has the smallest number of the pauses (e.g. six pauses). Accordingly the number of the voltage adjustment operations may be limited to be less than or equal to four, consistent with the description above with reference to FIG. 16. As such, the number of the voltage adjustment operations with respect to the one data frame may be determined based on a minimum number of the pauses included in the one data frame.

Figure 19:
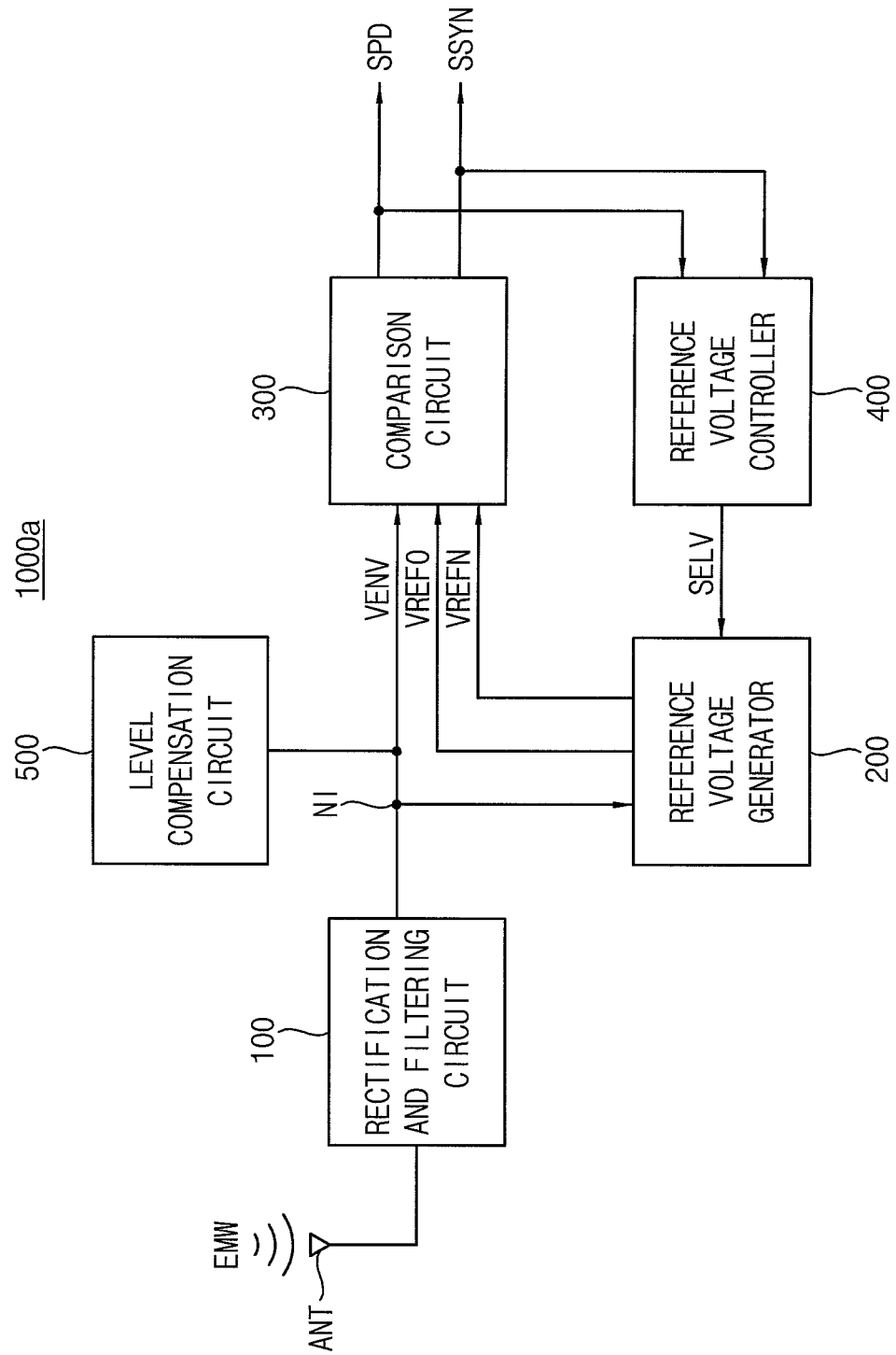
FIG. 19 is a block diagram illustrating a reception circuit of an NFC card according to embodiments of the inventive concept.
Figure 20:
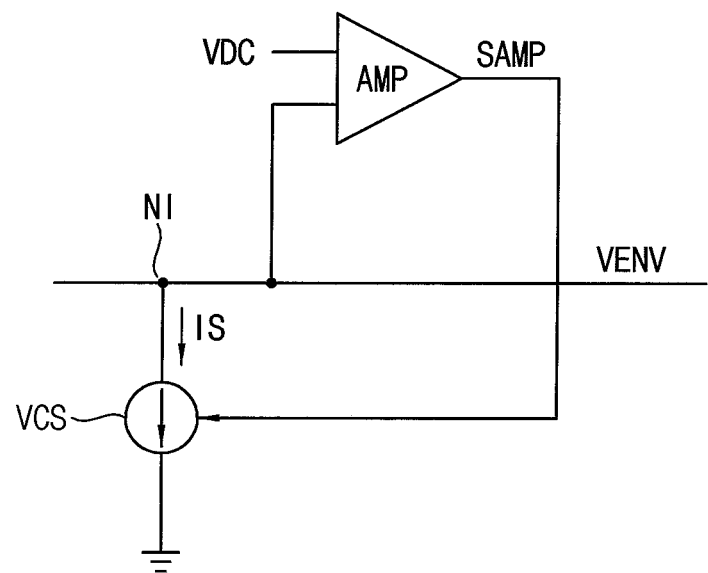
FIG. 20 is a diagram further illustrating in one example an input circuit included in the reception circuit of FIG. 19.

FIG. 19 is a block diagram illustrating a reception circuit of an NFC card according to embodiments of the inventive concept, and FIG. 20 is a diagram illustrating an input circuit included in the reception circuit of FIG. 19.

Referring to FIG. 19, a reception circuit 1000a of an NFC card again includes the input circuit 100, reference voltage generator 200, comparison circuit 300 and reference voltage controller 400, but also includes a level compensation circuit 500.

Here again, the input circuit 100 may receive the wireless signal EMW including pauses to generate an envelope voltage signal VENV at a node NI, and may include an antenna ANT and a rectification and filtering circuit. The reference voltage generator 200 may generate a detection reference voltage VREF0 and a selection reference voltage VREFN based on the envelope voltage signal VENV and a voltage selection signal SELV, where the selection reference voltage VREFN may vary depending on a minimum voltage level of the pauses. The comparison circuit 300 may generate a pause detection signal SPD activated during the pauses by comparing the envelope voltage signal VENV and the detection reference voltage VREF0 and generate a synchronization signal SSYN indicating a rising start time of the pauses by comparing the envelope voltage signal VENV and the selection reference voltage VREFN. And the reference voltage controller 400 may adjust a control value of the voltage selection signal SELV based on the pause detection signal SPD and the synchronization signal SSYN, where the reference voltage controller 400 may perform voltage adjustment operations corresponding to the pauses included in one data frame, and may adjust the control value of the voltage selection signal SELV, such that the selection reference voltage VREFN may be changed depending on the control value of the voltage selection signal SELV.

In certain embodiments, like those previously described above in relation to the embodiments illustrated in FIGS. 14, 15 and 16, the reference voltage controller 400 may determine a voltage that approaches most near the minimum voltage level of the pauses as the selection reference voltage VREFN, through the binary scanning scheme.

With these possible configuration(s) in mind, the level compensation circuit 500 may be used to maintain a DC voltage level of the envelope voltage signal VENV. An embodiment of the level compensation circuit will be described below with reference to FIG. 20, but the configuration of the level compensation circuit may be variously determined.

Referring to FIG. 20, the level compensation circuit 500 may include an amplifier AMP and a variable current source VCS. The amplifier AMP may be used to amplify a voltage difference between the envelope voltage signal VENV and a reference DC voltage VDC to generate an amplification signal SAMP, and the variable current source VCS may adjust a current flowing at the node NI of the envelope voltage signal VENV based on the amplification signal SAMP.

Using the level compensation circuit 500, the performance of reception circuit(s) and/or NFC card(s) according to embodiments of the inventive concept may be further enhanced by reducing adverse environmental and operating condition effects.

Figure 21:
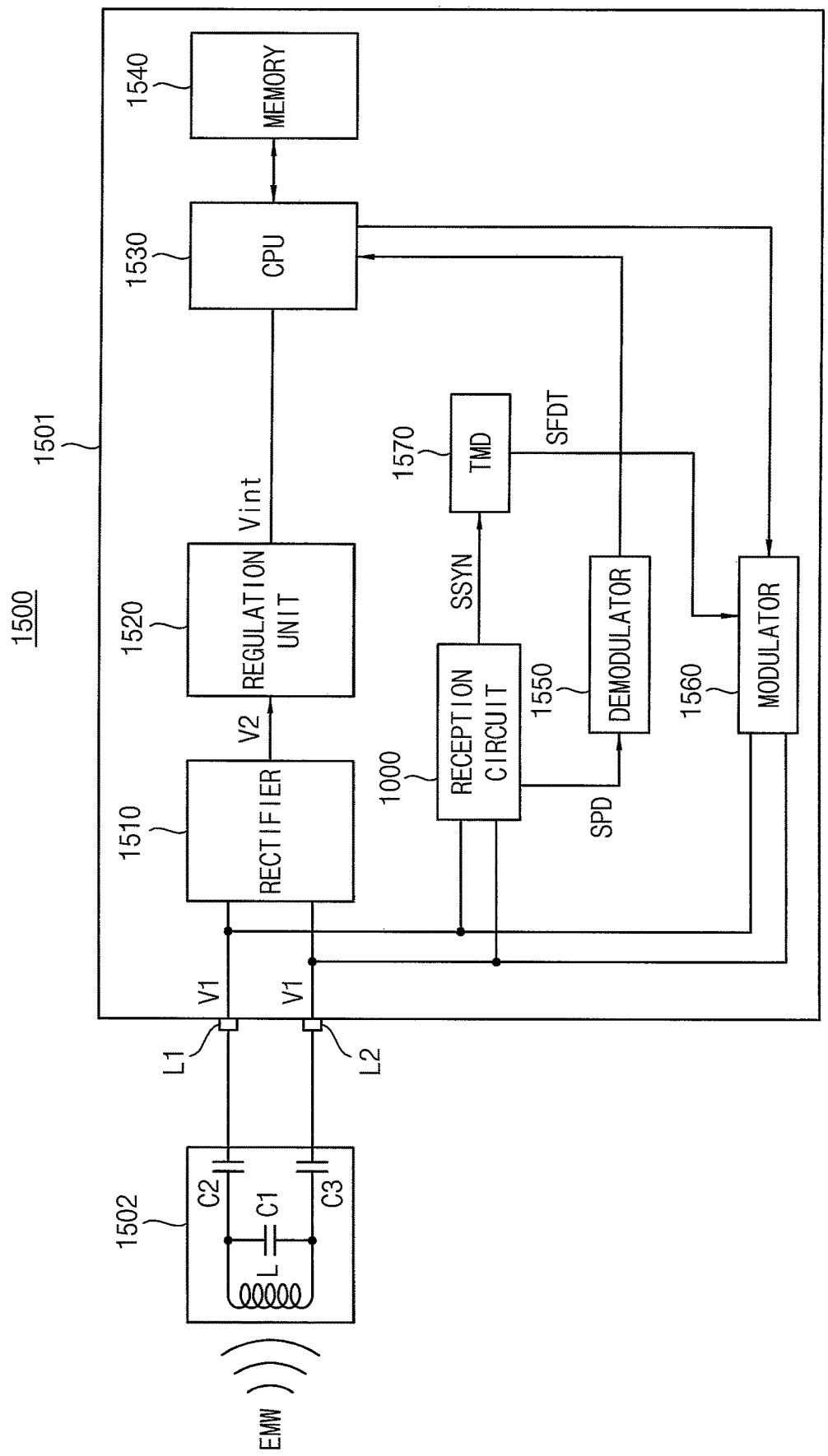
FIG. 21 is a block diagram illustrating an NFC card according to embodiments of the inventive concept.

FIG. 21 is a block diagram illustrating an NFC card according to embodiments of the inventive concept.

Referring to FIG. 21, an NFC card 1500 may include an NFC card chip 1501 and a resonance unit 1502.

The NFC card chip 1501 may be connected to the resonance unit 1502 through first and second power terminals L1 and L2.

The resonance unit 1502 may include a resonance circuit including an antenna and a first capacitor C11 to receive and transmit a wireless signal. The resonance unit 1502 may further include a filter including second and third capacitors C12 and C13 through which an induced voltage, in response to a received electromagnetic wave EMW, may be transferred to the first and second power terminals L1 and L2. The resonance unit 1502 may provide the induced voltage as a first voltage V1 to the NFC card chip 1501. The configuration of the resonance unit 1502 illustrated in FIG. 21 may be an example only, and the resonance unit 1502 may not be limited to the configuration illustrated in FIG. 21, but may be variously modified.

The NFC card chip 1501 may receive the first voltage V1 from the resonance unit 1502 through the first and second power terminals L1 and L2. The NFC card chip 1501 may include a reception circuit 1000, a rectifier 1510, a regulation unit 1520, a central processing unit (CPU) 1530, a memory 1540, a demodulator 1550, a modulator 1560, and a timing controller TMD 1570.

The rectifier 1510 may rectify the first voltage V1 to generate a second voltage V2 that is a direct-current (DC) voltage. The regulation unit 1520 may generate, for the reception circuit 1000, the CPU 1530, the demodulator 1550 and the modulator 560, an internal voltage Vint with a regular level, which may be used in the NFC card chip 1501.

The CPU 1530 may control overall operations of the NFC card chip 501. When a reception operation is performed, the reception circuit 1000 may generate a pause detection signal SPD and a synchronization signal SSYN as described above, based on a reception signal including pauses and provided through the first second power terminals L1 and L2.

The reception circuit may include an input circuit, a reference voltage generator, a comparison circuit and a reference voltage controller that are as described above. The input circuit may receive the signal including the pauses and generate an envelope voltage signal. The reference voltage generator may generate a detection reference voltage and a selection reference voltage based on the envelope voltage signal and a voltage selection signal, such that the selection reference voltage varies depending on a minimum voltage level of the pauses. The comparison circuit may generate the pause detection signal SPD activated during the pauses by comparing the envelope voltage signal and the detection reference voltage and generate the synchronization signal SSYN indicating a rising start time of the pauses by comparing the envelope voltage signal and the selection reference voltage. The reference voltage controller may adjust a control value of the voltage selection signal based on the pause detection signal SPD and the synchronization signal SSYN such that the selection reference voltage may be changed depending on the control value of the voltage selection signal.

The demodulator 1550 may generate a demodulation signal corresponding to the pauses of the wireless signal based on the pause detection signal SPD and provide the demodulated data to the CPU 1530. The CPU 1530 may store the demodulated data in the memory 1540.

When a transmission operation is performed, the CPU 1530 may read output data from the memory 1540 to provide the output data to the modulator 1560. The modulator 1560 may modulate the output data to provide a modulation signal to the resonance unit 1502 through the first and second power terminals L1 and L2. For example, the modulator 560 may perform a load modulation of the output data to generate the modulation signal.

The timing controller 1570 may generate a transmission timing signal SFDT based on the synchronization signal SSYN. The transmission timing signal SFDT may indicate a time point after a frame delay time FDT from the rising start time of a last pause of the pauses included in one data frame.

The timing controller 1570 may be implemented with flip-flops. The timing controller 1570 may use the determined selection reference voltage VREFN as described above and the synchronization signal SSYN as reset signals of the flip-flops that are synchronized with the carrier frequency, and thus the frame delay time of the reduced deviation may be realized.

The modulator 1560 may output the modulation signal to the resonance unit 1502 in synchronization with the timings indicated by the transmission timing signal SI-DT.

As described above, reception circuit(s) and/or NFC card(s) according to embodiments of the inventive concept may efficiently perform a demodulation operation by reducing the adverse effects of environmental and operating condition effects while using a relatively simple configuration. In addition, reception circuit(s) and/or NFC card(s) according to embodiments of the inventive concept may efficiently perform the demodulation operation by adaptively detecting a rising start time of a pause depending on changes of a wireless signal to implement the frame delay time having smaller deviations. In addition, reception circuit(s) and/or NFC card(s) according to embodiments of the inventive concept may reduce power consumption and overall circuit size by detecting the rising start time of the pause without additional clock circuitry. In addition, reception circuit(s) and/or NFC card(s) according to embodiments of the inventive concept may operate as a kind of an analog-to-digital converter (ADC) based on the selection reference voltage, and thus the transmission characteristics may be routinely checked and signal-to-noise ratio (SNR) may be improved.

The inventive concept may be applied to NFC cards, contactless IC cards, proximity cards, and the like, which perform near field communication, and any electronic devices and systems including the cards.

The foregoing is illustrative of embodiments and is not to be construed as limiting thereof. Although a few embodiments have been described, those skilled in the art will readily appreciate that many modifications are possible in the embodiments without materially departing from the scope of the inventive concept as defined by the following claims.

What is claimed is:

1. A reception circuit of a near field communication (NFC) card, comprising:
   an input circuit configured to receive a wireless signal including pauses and generate an envelope voltage signal;
   a reference voltage generator configured to generate a detection reference voltage and a selection reference voltage based on the envelope voltage signal and a voltage selection signal, wherein the selection reference voltage varies depending on a minimum voltage level of the pauses;
   a comparison circuit configured to generate a pause detection signal activated during the pauses by comparing the envelope voltage signal and the detection reference voltage and generate a synchronization signal indicating a rising start time of the pauses by comparing the envelope voltage signal and the selection reference voltage; and
   a reference voltage controller configured to adjust a control value of the voltage selection signal based on the pause detection signal and the synchronization signal, such that the selection reference voltage is changed depending on the control value of the voltage selection signal.

2. The reception circuit of claim 1, wherein the reference voltage controller is further configured to perform voltage adjustment operations corresponding to the pauses included in one data frame, and sequentially adjust the control value of the voltage selection signal, such that the selection reference voltage sequentially approaches the minimum voltage level of the pauses corresponding to the rising start time of the pauses.

3. The reception circuit of claim 2, wherein a number of the voltage adjustment operations with respect to the one data frame is determined based on a minimum number of the pauses included in the one data frame.

4. The reception circuit of claim 2, wherein the reference voltage controller is further configured to initialize the control value of the voltage selection signal during a first pause of the pauses included in the one data frame such that the selection reference voltage is a half of the detection reference voltage, and perform the voltage adjustment operations from a second pause of the pauses included in the one data frame.

5. The reception circuit of claim 4, wherein the wireless signal is a signal defined according to a type A interface of ISO/IEC 14443 Standards, and the number of the voltage adjustment operations with respect to the one data frame is four.

6. The reception circuit of claim 1, wherein reference voltage generator comprises:
   a plurality of division resistors connected in series between a power supply voltage and a ground voltage to provide a plurality of reference voltages; and
   a multiplexer configured to output one of the plurality of reference voltages as the selection reference voltage based on the voltage selection signal.

7. The reception circuit of claim 6, wherein the reference voltage generator further comprises a low pass filter configured to filter a voltage higher than the plurality of reference voltages to generate the detection reference voltage.

8. The reception circuit of claim 6, wherein the reference voltage generator further comprises:
   a transistor connected between the power supply voltage and the plurality of division resistors; and
   an amplifier configured to amplify a voltage difference between a voltage higher than the plurality of reference voltages and the envelope voltage signal to provide a gate voltage of the transistor.

9. The reception circuit of claim 1, wherein the comparison circuit comprises:
   a first comparator configured to compare a voltage level of the envelope voltage signal and the detection reference voltage to generate the pause detection signal; and
   a second comparator configured to compare the voltage level of the envelope voltage signal and the selection reference voltage to generate the synchronization signal.

10. The reception circuit of claim 9, wherein the reference voltage controller is configured to perform voltage adjustment operations of adjusting the control value of the voltage selection signal based on whether the synchronization signal is activated during activation periods of the pause detection signal.

11. The reception circuit of claim 9, wherein the pause detection signal is activated in a pulse form when the voltage level of the envelope voltage signal is lower than the detection reference voltage, and the synchronization signal is activated in a pulse form when the voltage level of the envelope voltage signal is lower than the selection reference voltage.

12. The reception circuit of claim 11, wherein the reference voltage controller is configured to adjust the control value of the voltage selection signal to decrease the selection reference voltage when the synchronization signal includes a pulse during each activation period of the pause detection signal, and adjust the control value of the voltage selection signal to increase the selection reference voltage when the synchronization signal does not include a pulse during each activation period of the pause detection signal.

13. The reception circuit of claim 1, wherein the input circuit includes:
   an antenna configured to receive the wireless signal;
   a rectification circuit configured to rectify an output of the antenna; and
   a low pass filter configured to filter an output of the rectification circuit to generate the envelope voltage signal.

14. The reception circuit of claim 13, wherein a cutoff frequency of the low pass filter is lower than a carrier frequency of the wireless signal.

15. The reception circuit of claim 1, further comprising:
   a level compensation circuit configured to maintain a DC voltage level of the envelope voltage signal.

16. The reception circuit of claim 15, wherein the level compensation circuit includes:
   an amplifier configured to amplify a voltage difference between the envelope voltage signal and a reference DC voltage to generate an amplification signal; and
   a variable current source configured to adjust a current flowing at a node of the envelope voltage signal based on the amplification signal.

17. A reception circuit of a near field communication (NFC) card, comprising:
   an antenna configured to receive a wireless signal including pauses;
   a rectification circuit configured to rectify an output of the antenna;

a first low pass filter configured to filter an output of the rectification circuit to generate an envelope voltage signal;
a plurality of division resistors connected in series between a power supply voltage and a ground voltage to provide a plurality of reference voltages;
a multiplexer configured to output one of the plurality of reference voltages as a selection reference voltage based on a voltage selection signal;
a second low pass filter configured to filter a voltage higher than the plurality of reference voltages to generate a detection reference voltage;
a first comparator configured to compare a voltage level of the envelope voltage signal and the detection reference voltage to generate a pause detection signal;
a second comparator configured to compare the voltage level of the envelope voltage signal and the selection reference voltage to generate a synchronization signal; and
a reference voltage controller configured to adjust a control value of the voltage selection signal based on the pause detection signal and the synchronization signal such that the selection reference voltage is changed depending on the control value of the voltage selection signal.

18. The reception circuit of claim 17, wherein the reference voltage controller is configured to:
perform voltage adjustment operations corresponding to the pauses included in one data frame; and
adjust the control value of the voltage selection signal sequentially whenever each of the voltage is performed such that the selection reference voltage sequentially approaches the minimum voltage level of the pauses corresponding to the rising start time of the pauses.

19. A near field communication (NFC) card comprising:
a resonance unit including an antenna configured to receive and transmit a wireless signal; and
an NFC card chip comprising:
an input circuit configured to receive a wireless signal including pauses and generate an envelope voltage signal;
a reference voltage generator configured to generate a detection reference voltage and a selection reference voltage based on the envelope voltage signal and a voltage selection signal, the selection reference voltage varying depending on a minimum voltage level of the pauses;
a comparison circuit configured to generate a pause detection signal activated during the pauses by comparing the envelope voltage signal and the detection reference voltage and generate a synchronization signal indicating a rising start time of the pauses by comparing the envelope voltage signal and the selection reference voltage;
a reference voltage controller configured to adjust a control value of the voltage selection signal based on the pause detection signal and the synchronization signal such that the selection reference voltage is changed depending on the control value of the voltage selection signal;
a demodulator configured to generate a demodulation signal corresponding to the pauses of the wireless signal based on the pause detection signal; and
a modulator configured to modulate output data to generate a modulation signal that is provided to the resonance unit.

20. The NFC card of claim 19, wherein the NFC card chip further comprises a timing controller configured to generate a transmission timing signal based on the synchronization signal, the transmission timing signal indicating a time point after a frame delay time from the rising start time of a last pause of the pauses included in one data frame.

* * * * *